US011275533B1

(12) United States Patent
Kabu et al.

(10) Patent No.: US 11,275,533 B1
(45) Date of Patent: Mar. 15, 2022

(54) PRINTED MATTER PROCESSING APPARATUS AND NON-TRANSITORY COMPUTER READABLE MEDIUM STORING PROGRAM FOR CREATING PRINTED MATTER BASED ON ENVIRONMENT

(71) Applicant: FUJIFILM Business Innovation Corp., Tokyo (JP)

(72) Inventors: Maiko Kabu, Kanagawa (JP); Hideki Sugiura, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/160,339

(22) Filed: Jan. 27, 2021

(30) Foreign Application Priority Data

Sep. 17, 2020 (JP) .............................. JP2020-156631

(51) Int. Cl.
| | |
|---|---|
| *H04N 1/00* | (2006.01) |
| *G06F 3/12* | (2006.01) |
| *H04N 1/56* | (2006.01) |
| *H04N 1/23* | (2006.01) |

(52) U.S. Cl.
CPC .......... *G06F 3/1208* (2013.01); *G06F 3/1256* (2013.01); *H04N 1/233* (2013.01); *H04N 1/2323* (2013.01); *H04N 1/56* (2013.01); *H04N 2201/0082* (2013.01)

(58) Field of Classification Search
None
See application file for complete search history.

(56) References Cited

U.S. PATENT DOCUMENTS

| 7,242,491 B2 | 7/2007 | Nakayasu et al. | |
|---|---|---|---|
| 2005/0081161 A1* | 4/2005 | MacInnes | G06K 9/00 715/765 |
| 2009/0015869 A1* | 1/2009 | Quek | G06F 3/1288 358/1.18 |
| 2011/0025709 A1* | 2/2011 | Ptucha | G06T 11/60 345/629 |
| 2011/0025714 A1* | 2/2011 | Ptucha | G09G 5/14 345/641 |
| 2012/0194555 A1* | 8/2012 | Byrnes | G06F 30/13 345/634 |

(Continued)

FOREIGN PATENT DOCUMENTS

| JP | 2002007270 | 1/2002 |
|---|---|---|
| JP | 2002132462 | 5/2002 |

(Continued)

*Primary Examiner* — Henok Shiferaw
(74) *Attorney, Agent, or Firm* — JCIPRNET (57) ABSTRACT

A printed matter processing apparatus includes an acquisition unit that acquires image data of an environment in which a printed matter is set, a processor, and a display unit, in which the processor configured to, by executing a program, input the image data acquired by the acquisition unit, display how the printed matter is seen in a case where the printed matter is set in the environment on the display unit, by compositing the printed matter in the image data in accordance with a printing condition of the printed matter, and decide the printing condition of the printed matter by changing the printing condition of the printed matter in accordance with a user operation and displaying the printed matter.

17 Claims, 7 Drawing Sheets

(56) References Cited

U.S. PATENT DOCUMENTS

| | | | | |
|---|---|---|---|---|
| 2015/0212771 | A1* | 7/2015 | Hori | G06F 3/1242 |
| | | | | 358/1.18 |
| 2018/0129399 | A1* | 5/2018 | Vegh-Hughes | G06F 3/1288 |
| 2018/0307448 | A1* | 10/2018 | Iwashita | G06F 3/129 |
| 2020/0134405 | A1* | 4/2020 | Saurav | G06K 15/1848 |
| 2020/0357132 | A1* | 11/2020 | Jovanovic | H04N 5/232933 |

FOREIGN PATENT DOCUMENTS

| | | |
|---|---|---|
| JP | 2005084783 | 3/2005 |
| JP | 2005108146 | 4/2005 |
| JP | 2006195765 | 7/2006 |
| JP | 2010165008 | 7/2010 |
| JP | 2014109772 | 6/2014 |
| JP | 2018106482 | 7/2018 |

* cited by examiner

PRINTED MATTER PROCESSING APPARATUS AND NON-TRANSITORY COMPUTER READABLE MEDIUM STORING PROGRAM FOR CREATING PRINTED MATTER BASED ON ENVIRONMENT

CROSS-REFERENCE TO RELATED APPLICATIONS

This application is based on and claims priority under 35 USC 119 from Japanese Patent Application No. 2020-156631 filed Sep. 17, 2020.

BACKGROUND

(i) Technical Field

The present invention relates to a printed matter processing apparatus and a non-transitory computer readable medium storing a program.

(ii) Related Art

In the related art, a function that enables an image actually output on paper to be checked in advance on a screen using a printing preview has been suggested.

For example, JP2010-165008A discloses an information processing apparatus that can display a printing preview image on which an accurate printing position on a printing surface of a printing medium is reflected. The information processing apparatus includes an acquisition section that acquires margin setting information set in accordance with an individual difference in image forming apparatus including a supply section supplying a recording medium, a calculation section that calculates a printing position based on the margin setting information acquired by the acquisition section and margin setting information related to printing data of a printing target, and a display control section that displays a preview image related to the printing data on a display section based on the printing position calculated by the calculation section.

SUMMARY

However, for example, in a case where an image when a printed matter is set is difficult to perceive like in a case of outputting a printed matter to be set in an event venue or the like, there is inconvenience such that printing is tried with a plurality of dimensions, reprinting is performed after actually setting the printed matter temporarily in the venue and correcting a printing condition such as the dimension, or the printed matter output under an inappropriate printing condition such as the dimension is set.

Aspects of non-limiting embodiments of the present disclosure relate to an information processing apparatus and a non-transitory computer readable medium storing a program that, even in a case of printing a printed matter to be set in an environment such as an event venue in which an image when the printed matter is set is difficult to perceive, eliminate unnecessary printing and obtain an appropriate printed matter for the environment.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printed matter processing apparatus including an acquisition unit that acquires image data of an environment in which a printed matter is set, a display unit, and a processor configured to, by executing a program, input the image data acquired by the acquisition unit, display how the printed matter is seen in a case where the printed matter is set in the environment on the display unit, by compositing the printed matter in the image data in accordance with a printing condition of the printed matter, and decide the printing condition of the printed matter by changing the printing condition of the printed matter in accordance with a user operation and displaying the printed matter.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described based on the drawings.

Figure 1:
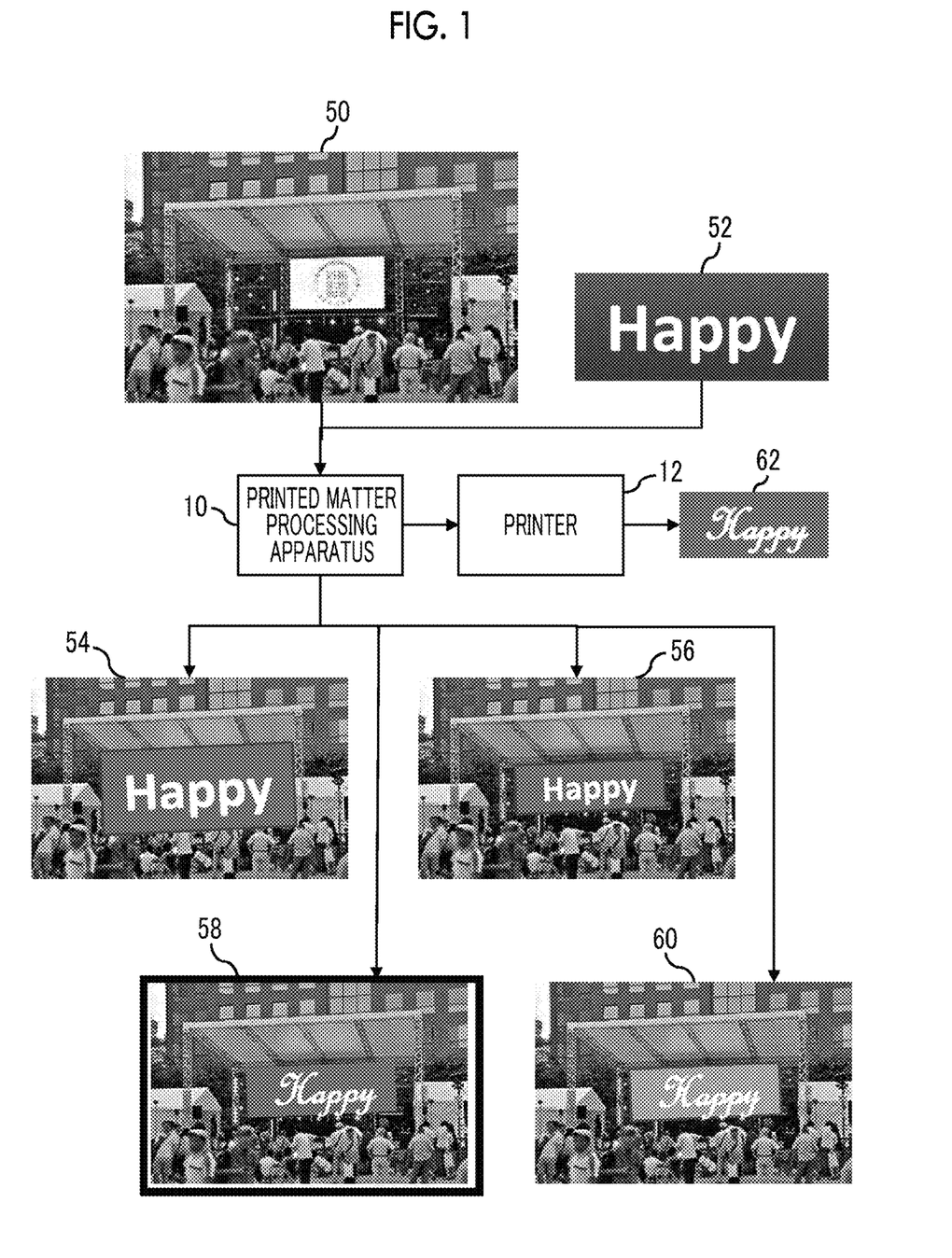
FIG. 1 is a system configuration diagram of an exemplary embodiment.

FIG. 1 is a configuration block diagram of a printed matter processing system according to the present exemplary embodiment. The printed matter processing system of the present exemplary embodiment includes a printed matter processing apparatus 10 and a printer 12.

The printed matter processing apparatus 10 decides a printing condition of a printed matter to be set in a specific environment such as an event venue, and outputs printing control data to the printer 12. The printer 12 prints the printed matter in accordance with the printing control data from the printed matter processing apparatus 10. The printed matter to be set in the specific environment such as the event venue is not limited and is, for example, a posted matter such as a horizontal banner or a vertical banner posted in the event venue, wallpaper pasted on a wall of a specific facility, a poster, or a cover laid on a table.

In the present exemplary embodiment, the posted matter such as the horizontal banner posted in the event venue will be described as, but not limited to, the printed matter.

The printed matter processing apparatus 10 inputs image data 50 indicating the event venue and a print detail 52 of the printed matter set by a user.

For example, the image data 50 is a venue picture in which the event venue is captured. The image data 50 includes a position or a region in which the posted matter is to be posted. In addition, for example, an object for estimating an actual dimension of the event venue is included.

The position at which the posted matter is to be posted is a position or a region in which the horizontal banner or the vertical banner is set on a stage, or a position or a region in which a signboard or the like is set.

The object for estimating the actual dimension of the event venue is an object having a normalized or standardized dimension, an object having a known dimension, or the like. For example, an object corresponding to such an object is exemplified by a sports court, a traffic signal, a traffic sign, a height of a stage for each type of building such as a sports center or a theater, an illumination device, a desk or a cabinet for an office, a musical instrument such as a piano, a violin, or a guitar, an emergency exit sign, a fire extinguisher or a fire hydrant, or a ransel. In addition, a person categorized by male and female/age/race or the like or a mode of transportation categorized by type such as passenger car/truck/bus/streetcar can be used.

As will be described later, the object for estimating the actual dimension of the event venue is used for estimating an actual dimension of the posted matter and compositing an image of the posted matter in the image data 50.

The print detail 52 of the printed matter is a detail (content) to be printed on the posted matter and is, for example, a word, a slogan, a catchphrase, an event detail, a schedule, or an order of ceremony. In FIG. 1, an English word "Happy" is exemplified as one example of the print detail.

In a case where the image data 50 and the print detail 52 are input, the printed matter processing apparatus 10 simulates a dimension, a font, a color, and the like of the posted matter when the print detail is assumed to be printed on the posted matter and posted in the event venue, composites the posted matter in the image data 50, and displays the image data 50. In FIG. 1, for example, four composited images are illustrated.

An image 54 is an image in which the image data 50 and the posted matter on which the print detail 52 is printed are composited on an assumption that the posted matter having an initial dimension is posted in the event venue. The initial dimension is the dimension of the posted matter that is estimated to be appropriate for the actual dimension of the event venue obtained from the image data 50 by the printed matter processing apparatus 10, and is a dimension that may be appropriately changed by an operation instruction of the user.

In addition, an image 56 is an image in which the image data 50 and the posted matter are composited on an assumption that the posted matter is posted in the event venue by reducing the dimension of the posted matter compared to a case of the image 54.

In addition, an image 58 is an image in which the image data 50 and the posted matter are composited on an assumption that the posted matter is posted in the event venue by maintaining the dimension of the posted matter in a case of the image 56 and changing a font of the print detail.

Furthermore, an image 60 is an image in which the image data 50 and the posted matter are composited on an assumption that the posted matter is posted in the event venue by maintaining the dimension and the font of the posted matter in a case of the image 58 and changing a background color of the print detail.

The printed matter processing apparatus 10 presents the composited images 54, 56, 58, and 60 obtained by simulation to the user by sequentially displaying the composited images 54, 56, 58, and 60 on a display device in accordance with an operation from the user. By visually recognizing the composited images 54, 56, 58, and 60, the user can check a state of the event venue in a case where the posted matter is posted on the composited images, and can determine whether or not the dimension, the font, and the background color of the posted matter are appropriate for an environment of the event venue.

More specifically, in a case where the user visually recognizes the composited image 54 on the display device, the user may feel that the dimension of the posted matter to be posted on the stage of the event venue is excessively large because surrounding objects are covered. At this point, the user provides an operation instruction to decrease the dimension of the posted matter to the printed matter processing apparatus 10.

The printed matter processing apparatus 10 receives the operation instruction to reduce the dimension of the posted matter from the user, creates an image of the posted matter by decreasing the dimension of the posted matter by a predetermined amount or an amount of the operation instruction, creates the composited image 56 by compositing the image of the posted matter with the image data 50 of the event venue, and redisplays the composited image 56 on the display device.

Next, in a case where the user visually recognizes the composited image 56 on the display device, determines that the dimension of the posted matter to be posted in the event venue is appropriate, and determines that a font of a text of the posted matter is not appropriate, the user provides an operation instruction to change the font of the posted matter to the printed matter processing apparatus 10.

The printed matter processing apparatus 10 receives the operation instruction to change the font of the posted matter from the user, creates the image of the posted matter by changing the font of the posted matter to another font, creates the composited image 58 by compositing the image of the posted matter with the image data of the event venue, and redisplays the composited image 58 on the display device.

Next, in a case where the user visually recognizes the composited image 58 on the display device, determines that the font of the posted matter to be posted in the event venue is appropriate, and further wants to change the background color of the posted matter, the user provides an operation instruction to change the background color of the posted matter to the printed matter processing apparatus 10.

The printed matter processing apparatus 10 receives the operation instruction to change the background color from the user, creates the image of the posted matter by changing the background color of the posted matter, creates the composited image 60 by compositing the image of the posted matter with the image data 50 of the event venue, and displays the composited image 60 on the display device. For example, the composited image 60 is created by changing the background color from blue to orange.

In a case where the user visually recognizes the composited image 60 on the display device, the user determines that blue before change is more appropriate than orange as the background color of the posted matter to be posted in the event venue. In a case where the user finally determines that the composited image 58 is most appropriate as the posted matter to be posted on the stage of the event venue, the user provides an operation instruction indicating such a determination to the printed matter processing apparatus 10. In FIG. 1, a bold frame is displayed around the composited image 58 and indicates that the composited image 58 is finally selected as being most appropriate by the user.

The printed matter processing apparatus 10 may display the composited images 54 to 60 in parallel on the display device instead of sequentially displaying the composited images 54 to 60 one at a time on the display device. Accordingly, the user may observe the composited images 54 to 60 by direct comparison with each other.

The printed matter processing apparatus 10 receives an instruction from the user, confirms the dimension, the font, and the background color of the posted matter defined in the composited image 58 as the printing condition of the posted matter, and outputs the printing control data including the printing condition to the printer 12. The printer 12 outputs a posted matter 62 based on the printing control data from the printed matter processing apparatus 10. For example, the printer 12 may be, but not necessarily limited to, a wide-format printer capable of printing the horizontal banner, the vertical banner, or the like.

In the present exemplary embodiment, the printed matter processing apparatus 10 simulates how the posted matter is seen in a case of posting the posted matter in the environment using the composited image, and presents (preview) the composited image to the user. The user can find the most appropriate printing condition for posting by changing the printing condition such as the dimension, the font, and the color of the posted matter in various manners while visually recognizing the composited image.

Accordingly, in the present exemplary embodiment, efficient posted matter printing can be performed even in a case where the image when the printed matter is set is difficult to perceive.

In the present exemplary embodiment, the printed matter processing apparatus 10 presents the composited images 54 to 60 of the image data 50 of the event venue and the image of the posted matter to the user by displaying the composited images 54 to 60 on the display device. However, note that only the printing control data including the printing condition of the posted matter is output to the printer 12, and that only the posted matter is printed and output by the printer 12. That is, a printing target of the printer 12 is only the posted matter, that is, an actual object to be posted in the event venue, and is neither the image data 50 of the event venue nor any of the composited images 54 to 60.

Figure 2:
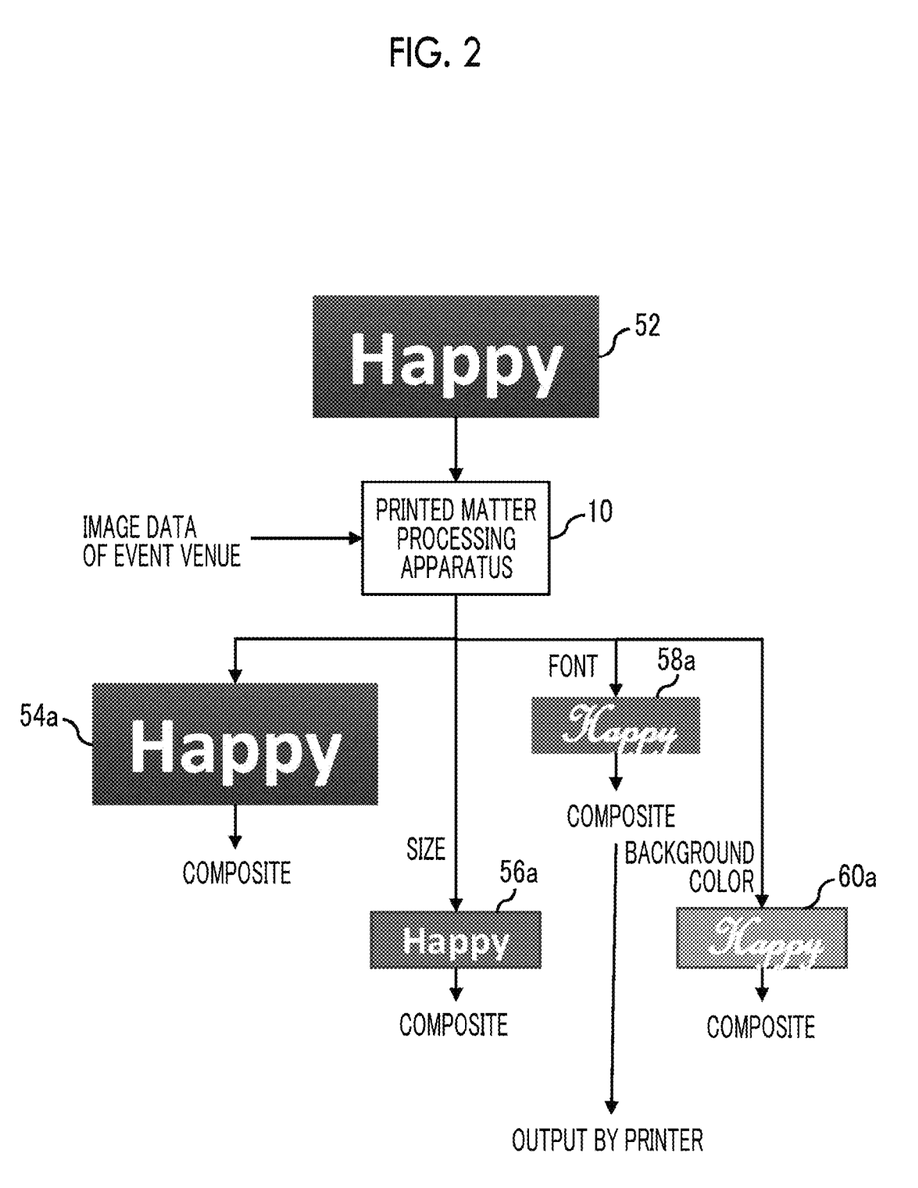
FIG. 2 is a descriptive diagram of a simulation of a posted matter image of the exemplary embodiment.

In FIG. 2, only changes in printing condition of the posted matter in the printed matter processing apparatus 10 are extracted and illustrated.

The user decides the print detail 52 of the posted matter and inputs the print detail 52 into the printed matter processing apparatus 10. For example, the print detail 52 is "Happy" and is input from a keyboard or the like. At this point, the user may designate the font, the background color, and the like of the text as an initial value, or a default font and a default background color may be used.

In addition, the printed matter processing apparatus 10 acquires the image data of the event venue and generates an image 54a of the posted matter by estimating an appropriate dimension of the posted matter with respect to the acquired image data of the event venue. For example, in a case of the horizontal banner posted on the stage of the event venue, the initial image 54a is generated by estimating a size of the stage of the event venue, estimating an appropriate dimension of the horizontal banner to be posted on the stage to be 10 m in length, 1 m in width, and the like, and arranging the print detail 52 based on the estimated appropriate dimension. The initial image 54a is composited in the image data 50 of the event venue and is displayed on the display device as the composited image 54. For example, the user decides a compositing position of the image 54a in the image data 50 of the event venue while visually recognizing the composited image data 54 and provides an operation instruction for the compositing position to the printed matter processing apparatus 10.

In a case where an operation instruction to change the dimension, for example, an instruction to reduce the dimension, for the composited image 54 is received from the user, the printed matter processing apparatus 10 generates an image 56a by changing the appropriate dimension of the horizontal banner to be posted on the stage to 8 m in length, 80 cm in width, and the like from 10 m in length and 1 m in width, and arranging the print detail 52 based on the changed dimension. The image 56a is composited in the image data 50 of the event venue and is displayed on the display device as the composited image 56. A compositing position of the image 56a in the image data of the event venue is a position that is decided in advance and provided to the printed matter processing apparatus 10 as an operation instruction by the user.

In a case where an operation instruction to change the font is received from the user, the printed matter processing apparatus 10 generates an image 58a by maintaining 8 m in length and 80 cm in width of the appropriate dimension of the horizontal banner to be posted on the stage and changing the font of the print detail 52. The image 58a is composited in the image data of the event venue and is displayed on the display device as the composited image 58. A compositing position of the image 58a in the image data of the event venue is a position that is decided in advance and provided to the printed matter processing apparatus 10 as an operation instruction by the user.

In a case where an operation instruction to change the background color is further received from the user, the printed matter processing apparatus 10 generates an image 60a by maintaining the dimension and the font of the horizontal banner to be posted on the stage and changing the background color of the print detail 52 from, for example, blue to orange. The image 60a is composited in the image data of the event venue and is displayed on the display device as the composited image 60. A compositing position of the image 60a in the image data of the event venue is a position that is decided in advance and provided to the printed matter processing apparatus 10 as an operation instruction by the user.

In a case where the user finally makes a decision by determining that the composited image 58 is most appropriate, the printed matter processing apparatus 10 confirms a dimension (8 m in length and 80 cm in width), a font, and a background color (blue) of the image 58a used in a case of creating the composited image 58 as the printing condition, and outputs the printing control data to the printer 12. The printing control data does not include information related to the image data of the event venue.

In this example, the user basically confirms one printing condition by selecting one composited image determined to be most appropriate from a plurality of the composited images 54 to 60. Alternatively, a plurality of printing conditions can be confirmed by selecting a plurality of composited images depending on cases. However, from a viewpoint of eliminating unnecessary printing, an upper limit of the number of printing conditions may be set.

Next, a specific configuration of the printed matter processing apparatus 10 of the present exemplary embodiment will be described.

Figure 3:
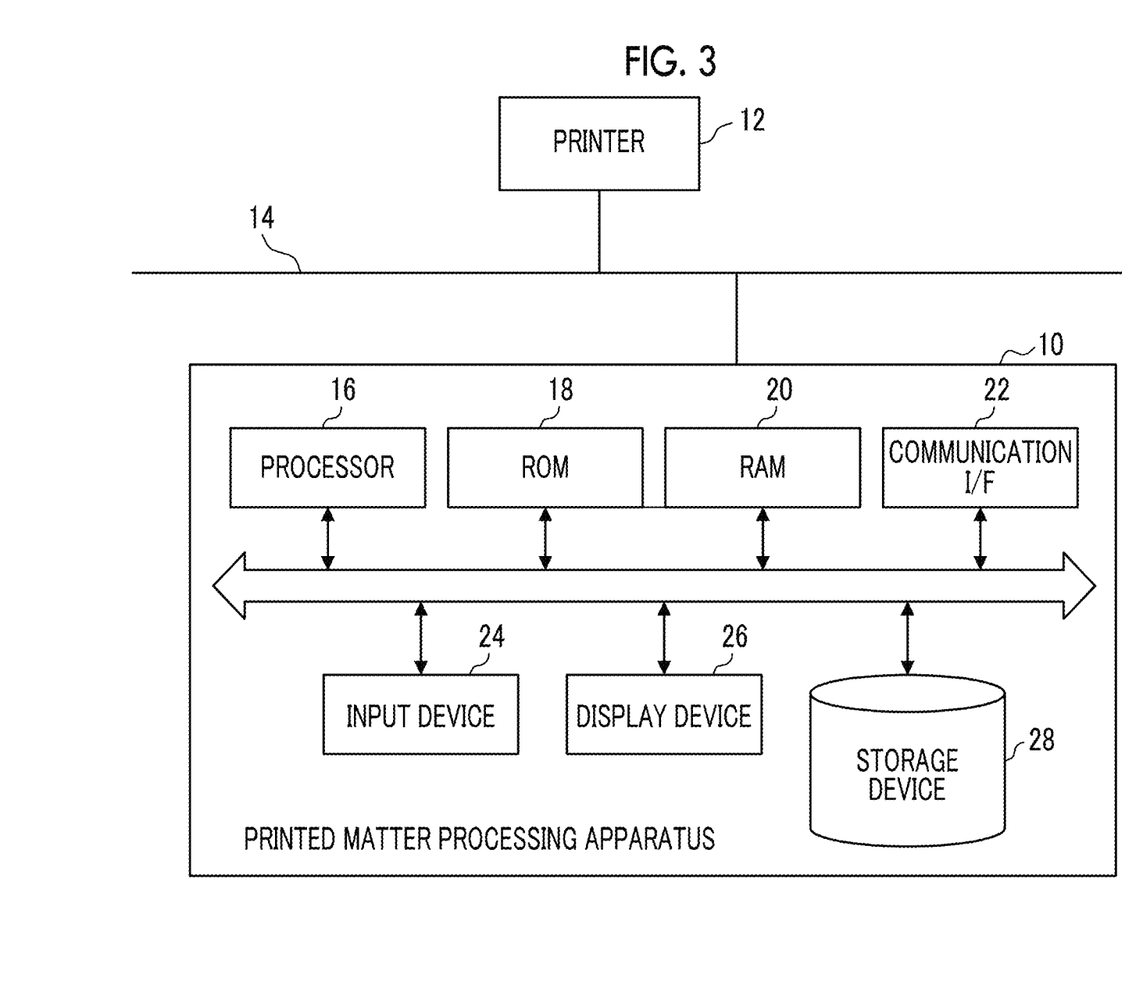
FIG. 3 is a configuration block diagram of a printed matter processing apparatus of the exemplary embodiment.

FIG. 3 is a configuration block diagram of the printed matter processing apparatus 10. The printed matter processing apparatus 10 is configured with a computer and includes a processor 16, a ROM 18, a RAM 20, a communication interface (I/F) 22, an input device 24, a display device 26, and a storage device 28.

The processor 16 implements various types of processing by reading a program stored in a program memory such as the ROM 18 and executing the program using the RAM 20 as a work memory. Processing of the processor 16 is specifically as follows.

Acquire and input the image data of the event venue.
    Input the print detail.
    Generate the composited image showing how the posted matter is seen in a case where the posted matter is posted in the event venue, and display the composited image on the display device 26.
    Generate the composited image by changing the printing condition of the posted matter in accordance with a user operation and display the composited image on the display device 26.
    Confirm the printing condition of the posted matter in accordance with a user operation and output the printing control data to the printer 12.

The communication I/F 22 transmits and receives data with the printer 12 via a network 14. The processor 16 outputs the printing control data to the printer 12 via the communication I/F 22 and the network 14.

The input device 24 inputs the image data of the event venue and the print detail. The input device 24 is configured with a keyboard, a mouse, a touch panel, a scanner, or the like.

The display device 26 is configured with a liquid crystal display, an organic EL display, or the like. The display device 26 may be configured with a touch panel.

The storage device 28 is configured with an HDD, an SSD, or the like and stores the input image data, the print detail, the composited image, the printing condition, and the like.

The network 14 may be wired/wireless and a public line/a dedicated line. One example of the network 14 is a wireless local area network (LAN).

In FIG. 3, the printed matter processing apparatus 10 and the printer 12 are connected to the network 14. Alternatively, a user terminal, the printed matter processing apparatus 10, and the printer 12 may be further connected to the network 14. In this case, functions of the input device 24 and the display device 26 of the printed matter processing apparatus 10 in FIG. 3 may be provided by the user terminal. The user terminal may be a portable terminal such as a smartphone or may be a PC, a tablet terminal, or the like. In a case of the portable terminal, the user may capture a picture of the event venue in the event venue and transmit the picture to the printed matter processing apparatus 10, check the composited image from the printed matter processing apparatus 10 on the portable terminal, and decide the dimension, the font, the color, and the like of the horizontal banner to be posted on the stage of the event venue while being present in the event venue.

As will be described later, the processor 16 estimates the actual dimensions of the event venue and the posted matter from the image of the event venue using a machine learning model. In this case, a learning data set may be acquired from another server computer connected to the network 14. Various parameters of the learning data set and the machine learning model may be stored in the storage device 28.

Next, processing in the present exemplary embodiment will be described in detail.

Figure 4:
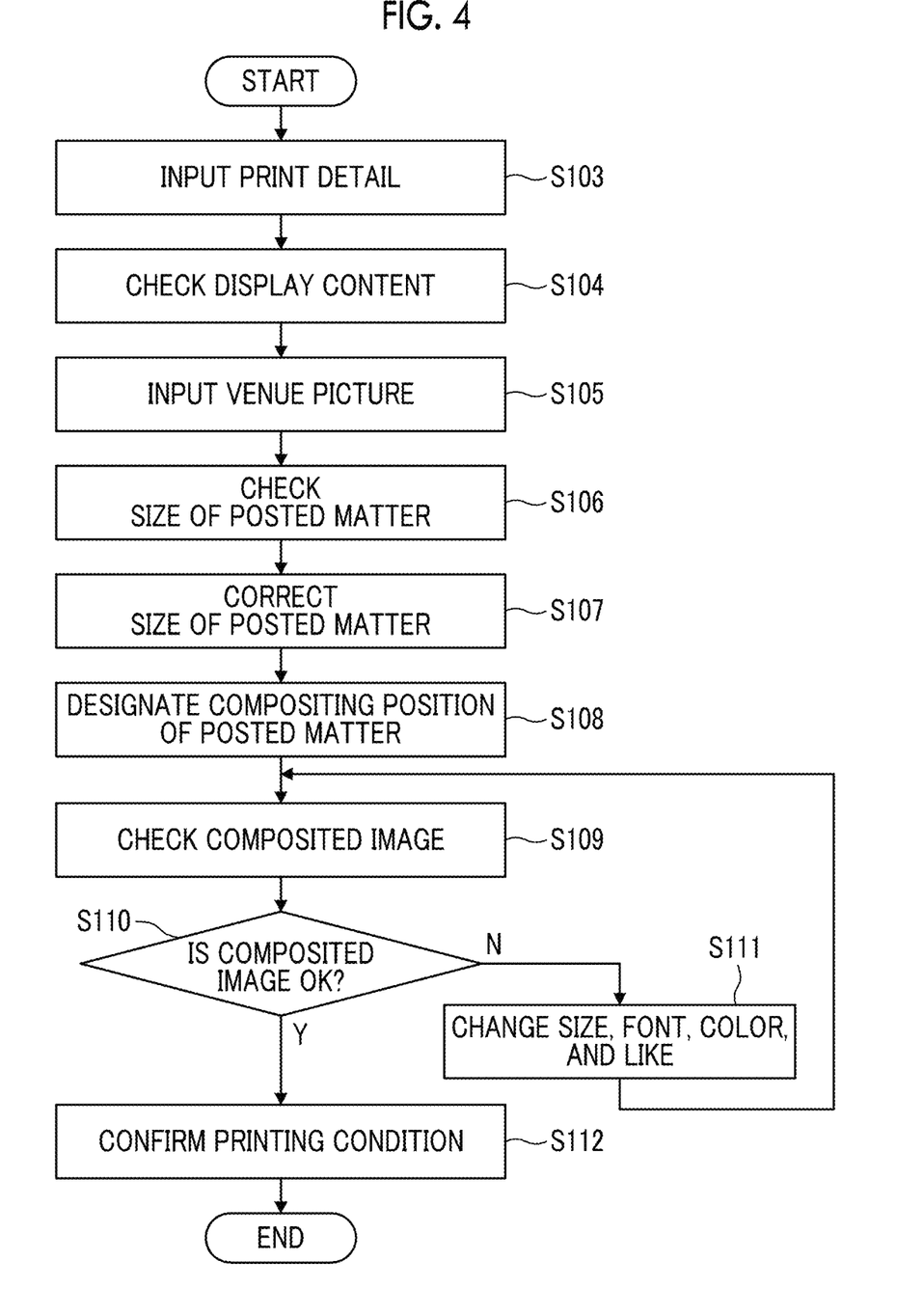
FIG. 4 is a processing flowchart of a user operation of the exemplary embodiment.

FIG. 4 is a processing flowchart of the present exemplary embodiment and is an operation flowchart of the user using the printed matter processing apparatus 10.

First, the user starts a processing program (application) installed on the printed matter processing apparatus 10 and inputs the print detail 52 to be printed on the posted matter from the input device 24 (S103). The print detail 52 is a word, a slogan, a phrase, an order of ceremony, or the like. Here, the English word "Happy" is assumed to be input. In a case where the print detail 52 is input, the processor 16 stores the print detail 52 in the storage device 28 and displays the print detail 52 on the display device 26. A printing medium on which the print detail 52 is to be printed may be specified and input together with the print detail 52. For example, the printing medium is the "horizontal banner", the "vertical banner", or the "signboard". In addition, in a case where a dimension of the printing medium is known, the dimension may also be input. In addition, a basic shape of the posted matter may be input. The shape is "rectangular", "horizontally long", "vertically long", or the like.

The user checks the print detail 52 displayed on the display device 26 (S104). In a case where the print detail is correct, the user proceeds. Otherwise, the user appropriately inputs a detail of change from the input device 24.

After the print detail 52 is checked, the user inputs the venue picture from the input device 24 as the image data 50 of the event venue. For example, the user acquires the picture or the like of the event venue as the image data 50 by capturing the picture using the portable terminal, a digital camera, or the like. In a case where the picture of the event venue is already present, the picture may be used. In addition, at this point, the input device 24 functions as an acquisition unit of the image data 50. Specifically, the venue picture is input by converting the picture into digital data using the scanner. The picture may be input in a wired or wireless manner from the portable terminal. At this point, the communication I/F 22 functions as the acquisition unit of the image data 50. In a case where the image data 50 of the event venue is acquired, the processor 16 estimates the dimension of the event venue, particularly, a dimension of the stage on which the posted matter is to be posted, and estimates the dimension of the posted matter to be posted in the event venue by processing the image data 50.

In a case of estimating the dimension of the event venue and the dimension of the posted matter, the processor 16 may use, for example, the machine learning model. Learning data for building the model includes a plurality of pieces of picture data in which the posted matter such as the horizontal banner or the vertical banner that can be created using the wide-format printer is captured. Attribute data such as the dimension, a pictograph, and the like of the posted matter captured in the picture data, for example, a font dimension, a font type, and a dimension of another object captured in the picture data, is prepared as the learning data set in the picture data.

For example, the other object is the object having the normalized dimension, or the object having the known dimension. The normalized object is exemplified by a sports court, a traffic signal, a traffic sign, or the like. The object having the known dimension is exemplified by a famous building such as Tokyo Tower or Tokyo Dome. An object of which a standard dimension is decided can also be used. The object of which the standard dimension is decided is exemplified by a stage for each type of building such as a sports center or a theater, an illumination device, a desk or a file cabinet included in an office, a musical instrument such as a piano, a violin, or a guitar, an emergency exit sign, a fire extinguisher or a fire hydrant, or a ransel. Furthermore, a person categorized by male and female/age/race or the like or a mode of transportation categorized by type such as passenger car/truck/bus/streetcar, or the like may be used.

The dimension of the event venue and the dimension of the pictograph can be estimated from a picture not having dimension data by using the model subjected to machine learning using the learning data set. In addition, the font type of the horizontal banner or the like can be estimated.

As preprocessing for using the machine learning model, the object used in the learning data set is searched for by performing object recognition of recognizing the object captured in the acquired and input image data 50. At this point, the object having the normalized dimension and the object having the known dimension are preferentially searched for. In a case where these objects cannot be detected, the object of which the standard dimension is decided is next preferentially searched for. By selecting the machine learning model that uses the detected object as the learning data set among machine learning models, the actual dimension of the event venue and furthermore, the actual dimension and the font of the posted matter to be posted in the event venue may be accurately estimated.

For example, the machine learning model that is subjected to machine learning using, as the learning data set, the picture data in which the stage and the horizontal banner or the vertical banner posted on the stage are captured as the object among various pieces of picture data of the event venue, and that outputs the dimension of the posted matter and furthermore, the font type and the font dimension of the posted matter in a case where the picture data is input is generated. The processor 16 inputs the venue picture acquired and input in S105 into the machine learning model as input data and outputs the dimension of the posted matter and furthermore, the font type and the font dimension of the posted matter as output data. The processor 16 creates the machine learning model, in other words, a dimension estimation model, by inputting the learning data set into a learner. For example, a neural network (NN) or a convolutional neural network (CNN) can be used as the learner. However, the machine learning model of the present exemplary embodiment is not limited to a specific model.

The processor 16 reflects the dimension of the posted matter and furthermore, the font type and the font dimension of the posted matter estimated using the machine learning model on the text in the print detail 52, and displays the print detail 52 on the display device 26 as the image of the posted matter.

The user checks the dimension (size) of the posted matter displayed on the display device 26 (S106) and appropriately corrects the dimension by increasing or decreasing the dimension as necessary (S107). At this point, the image of the posted matter is not yet composited with the image data 50 of the event venue, and a state of an image of how the posted matter is seen in a case where the posted matter is posted in the event venue cannot be specifically perceived. Thus, a certain degree of correction may be performed.

Next, the user composites the image of the posted matter having the adjusted dimension in the venue picture input in S105 (S108). The processor 16 displays the image data 50 of the venue picture together with the image of the posted matter having the adjusted dimension and moves a position of the image of the posted matter in accordance with a user operation. For example, the user operates the mouse as the input device 24 and decides the compositing position by drag and drop of the posted matter image. Besides, the compositing position may be decided by moving the image of the posted matter upward, downward, leftward, and rightward by operating upward, downward, leftward, and rightward cursor keys. In addition, an inclination of the image can be decided by rotating the image by operating the mouse. The processor 16 composites the image data 50 of the venue picture with the image of the posted matter at the compositing position decided by the user operation and displays the composited image on the display device 26.

Figure 5:
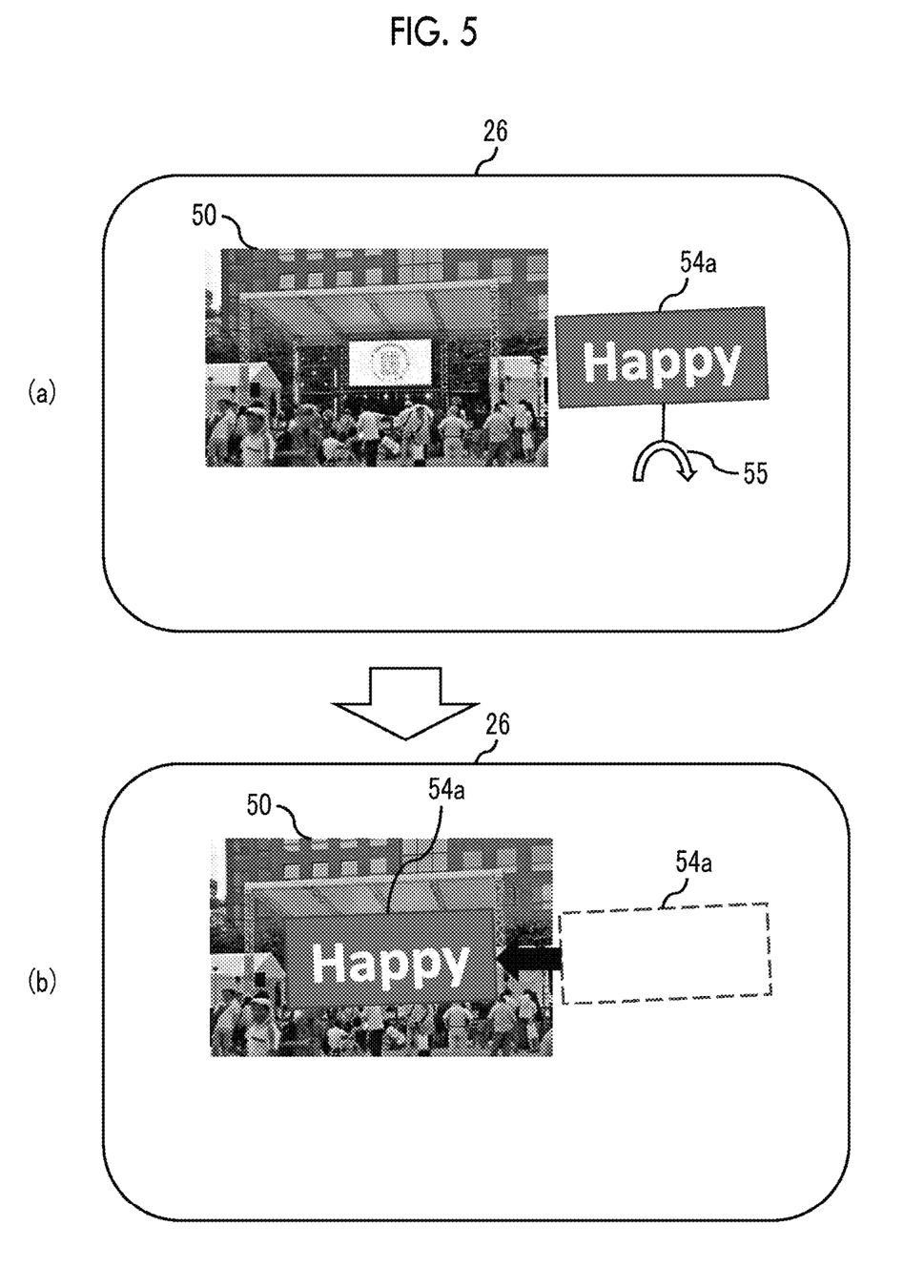
FIG. 5 is a descriptive diagram of decision of a compositing position of the exemplary embodiment.

FIG. 5 illustrates processing of compositing the image data 50 of the venue picture with the image of the posted matter. As illustrated in (a) of FIG. 5, the image data 50 of the venue picture and the image 54a of the posted matter are displayed in parallel on the display device 26. For example, the user moves the posted matter image 54a of the posted matter to an intended position, specifically, a position of the horizontal banner on the stage, in the image data 50 by drag and drop using the mouse. In addition, an operation icon 55 for performing a rotation operation on the image 54a of the posted matter is displayed near the image 54a of the posted matter. The user rotates the image 54a of the posted matter by an intended angle by operating the operation icon 55 and decides an inclination of the image 54a of the posted matter. In addition, (b) of FIG. 5 illustrates a state after the image 54a of the posted matter is moved. The processor 16 recognizes this position as the compositing position and stores positional information in the RAM 20 or the storage device 28. In the subsequent part of simulation, compositing simulation is executed using the stored positional information.

For example, compositing may be performed such that the user designates the compositing position or a region in the image data 50 using the mouse, the cursors, or the like, and that the processor 16 automatically moves the image 54a of the posted matter to the designated position or the region. Alternatively, the processor 16 may automatically recognize the compositing position or the region of the image 54a of the posted matter in the image data 50 and composite the image 54a of the posted matter at the position or the region. Recognition of the compositing position may be executed using machine learning described above. Specifically, the image 54a of the posted matter is composited by learning a position of the horizontal banner on the stage from the learning data set and extracting a region recognized as the horizontal banner from the image data 50.

Returning to FIG. 4, in a case where the composited image is displayed on the display device 26, the user checks the composited image (S109). A determination as to whether or not the composited image is OK is performed (S110). In a case where the composited image is OK, the user confirms the printing condition by inputting (for example, by operating an "OK button displayed on the display device 26) such a determination from the input device 24 (S112).

Meanwhile, in a case where the user determines that the composited image is not OK (NO in S110), the user inputs (for example, operates a "change" button displayed on the display device 26) such a determination from the input device 24 and provides an instruction to change the dimension, the font, the background color, and the like of the image 54a of the posted matter (S111). The above processing is repeatedly executed until a determination that the composited image is OK is made. In addition, in a case of NO in S110, the composited image created at the time can be stored in the RAM 20 or the storage device 28 for final comparison by the user in S109.

At a time of changing, a change menu is displayed on the display device 26, and any of the dimension, the font, and the color is selected. In a case where the dimension is selected, an enlargement and reduction menu is further displayed. In a case where the font is selected, the font type is further displayed. Ina case where the color is selected, various color menus are displayed. The user sequentially selects an intended dimension, a font, and a color. Each time a change is made, the composited image at the time can be stored in the RAM 20 or the storage device 28 for final comparison by the user in S109.

Figure 6:
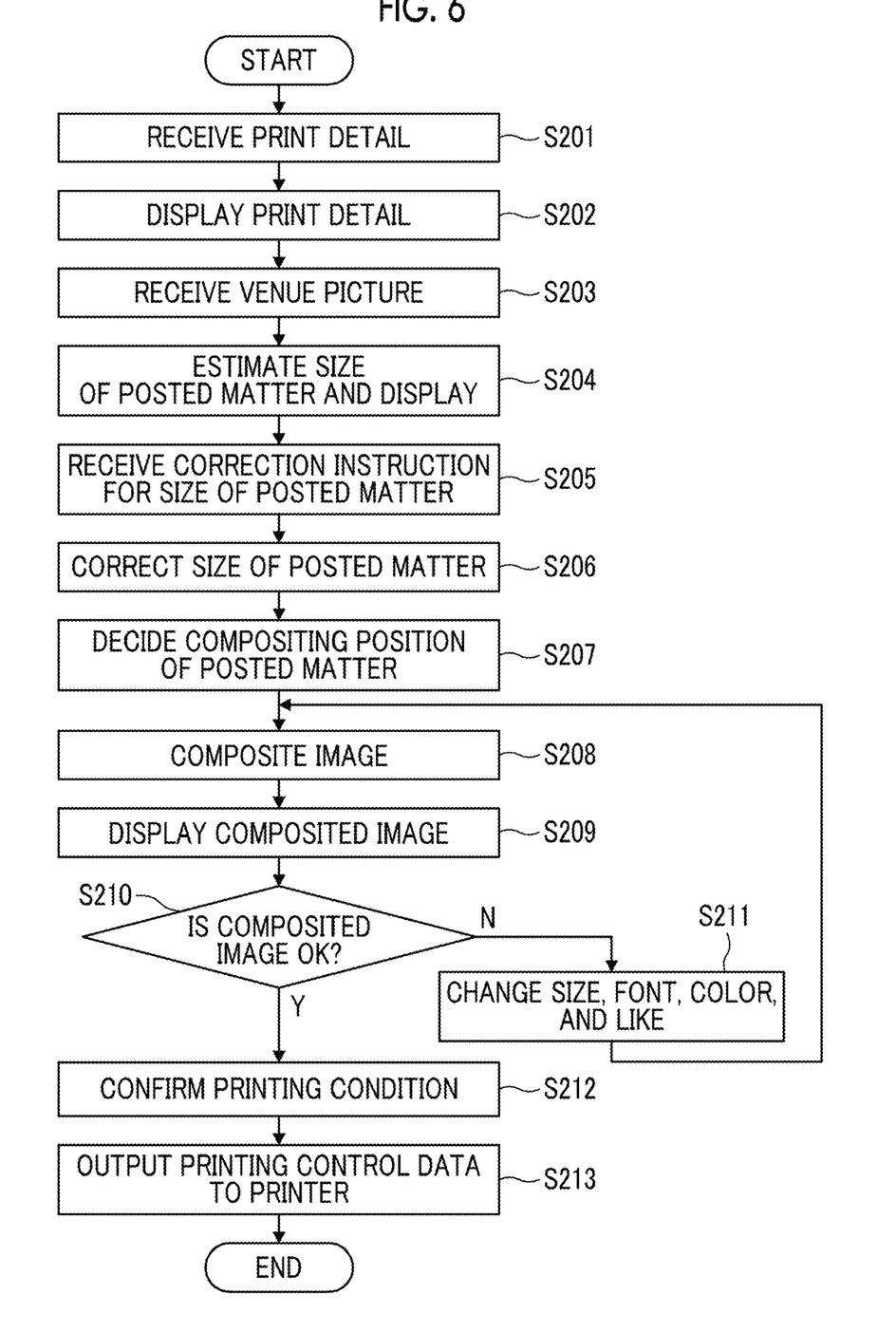
FIG. 6 is a processing flowchart of a processor of the exemplary embodiment.

FIG. 6 is a processing flowchart of the present exemplary embodiment and is a flowchart of the processor 16.

First, the processor 16 receives the print detail 52 input from the input device 24 (S201) and stores the print detail 52 in the storage device 28 displays the print detail 52 on the display device 26 (S202).

Next, the processor 16 receives the image data 50 of the venue picture acquired from the input device 24 (S203) and stores the image data 50 in the storage device 28. The image data 50 of the venue picture may be acquired from an external server or a computer via the network 14 in accordance with an instruction from the user. In a case where the venue picture is stored in the portable terminal such as the smartphone of the user, the venue picture stored in the portable terminal may be acquired via the network 14.

Next, in a case where the image data 50 of the venue picture is received, the processor 16 estimates the dimension of the posted matter based on the image data of the venue picture and displays the posted matter on the display device 26 (S204). This processing corresponds to processing of S106 in FIG. 4. The actual dimension of the event venue and the dimension of the posted matter are estimated using the machine learning model. In a case where the user provides a correction instruction for the dimension of the posted matter from the input device 24, this correction instruction is received (S205), and the dimension of the posted matter is corrected (S206). This step may be omitted because a correction operation while visually recognizing the composited image will be performed later. This step may be omitted in a case where accuracy of the machine learning model is high.

Next, the compositing position in a case of compositing the image data 50 of the venue picture with the image 54*a* of the posted matter is decided (S207). This processing corresponds to processing of S108 in FIG. 4. Decision of the compositing position is any of manual decision by the user and automatic decision by the processor 16 and may be configured such that the user can select any of the manual/automatic decision.

Specifically, the processor 16 displays "manual" and "automatic" buttons on the display device 26. In a case where the user performs a selection operation on the manual button, the user manually decides the compositing position using the procedure illustrated in FIG. 5. In a case where the user performs the selection operation on the automatic button, the compositing position is estimated using the machine learning model and presented to the user. Even in a case of the automatic decision, for example, a final decision is made through a checking operation of the user. Semi-automatic processing such as estimating the compositing position or the compositing region in the image data 50 using the machine learning model and presenting the compositing position or the compositing region to the user by displaying the position or the region in the image data 50 in a highlighted manner may also be performed.

Next, the processor 16 stores the decided compositing position in the RAM 20 or the storage device 28, composites the image data 50 of the venue picture with the image 54*a* of the posted matter having the corrected dimension (S208), and displays the composited image on the display device 26 (S209).

Figure 7:
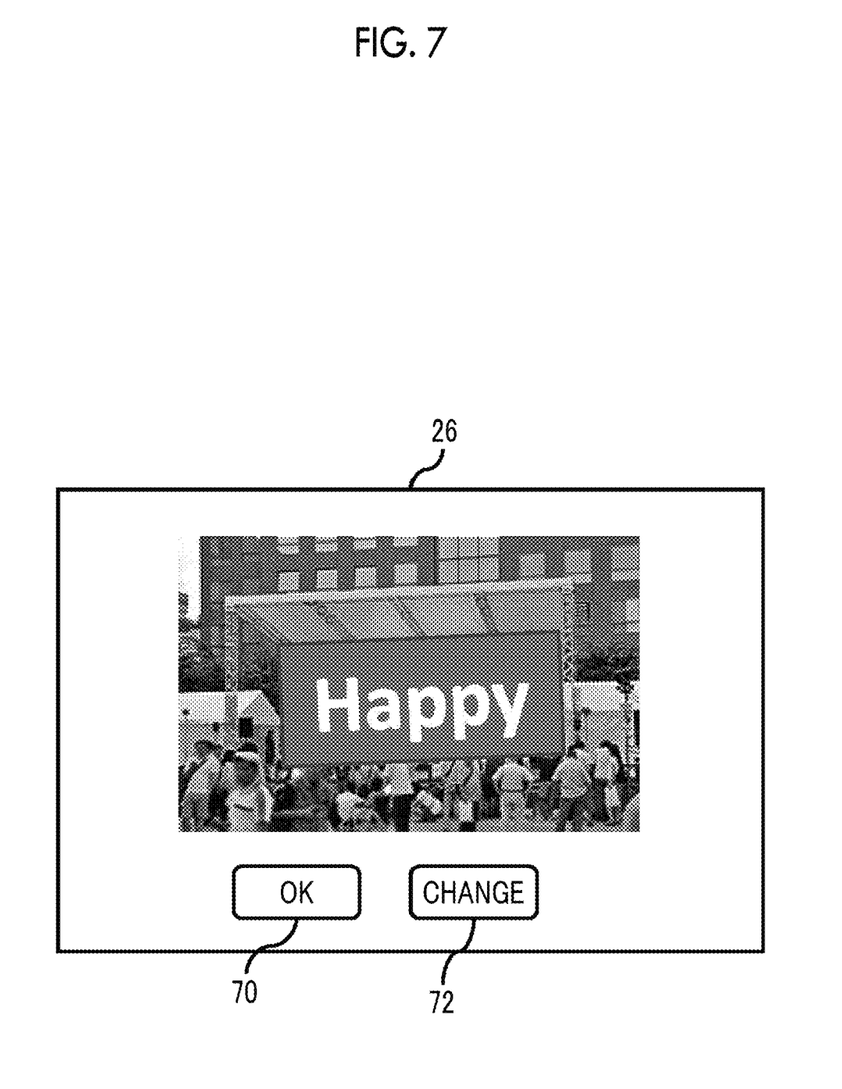
FIG. 7 is a descriptive diagram of a display screen of a display device of the exemplary embodiment.

Next, the processor 16 determines whether or not the composited image is OK based on an instruction from the user (S210). That is, the "OK" button and the "change" button are displayed on the display device 26. In a case where the user operates the "OK" button, a determination that the composited image is OK is made, and the dimension, the font, and the background color of the image 54*a* of the posted matter displayed at the time as the composited image are confirmed as the printing condition (S212). The printing control data including the printing condition is output to the printer 12, and the posted matter is printed (S213). FIG. 7 illustrates a display example on the display device 26. For example, an "OK" button 70 and a "change" button 72 are displayed below the composited image. The user provides an input by performing a selection operation on any button from the input device 24.

Meanwhile, in a case where the user operates the "change" button, a determination that the composited image is not OK is made (NO in S210), and the processor 16 creates the composited image again (S208) by changing the dimension, the font, the color, and the like of the image 54*a* of the posted matter in accordance with an operation instruction of the user (S211) and displays the composited image on the display device 26 (S209). The above processing is repeatedly executed until the composited image becomes OK. In addition, in a case of NO in S210, and in a case where the user stores the composited image during changing, the composited image at the time is stored in the RAM 20 or the storage device 28 for composited image comparison in S209.

Specifically, as illustrated in FIG. 2, for example, the composited images 54 to 60 are sequentially generated using the posted matter image 56*a* obtained by reducing the dimension of the posted matter image 54*a*, the posted matter image 58*a* obtained by changing the font of the posted matter image 56*a*, and the posted matter image 60*a* obtained by changing the background color of the posted matter image 58*a*.

While the exemplary embodiment of the present invention is described above, the present invention is not limited to the exemplary embodiment and can be subjected to various changes.

For example, the dimension, the font, and the color (background color) are illustrated as the printing condition in the present exemplary embodiment. Besides, a pattern, resolution, and a type, a material, and the like of paper may be included. Regarding the pattern, the resolution, and the like, the pattern, the resolution, and the like may be estimated using the machine learning model, set as an initial value, and changed in various manners in accordance with a change operation instruction from the user.

In the present exemplary embodiment, the picture of the event venue is captured and acquired as the image data 50. However, in a case where the picture of the event venue is not present, image data of a venue similar to the event venue may be searched for and acquired on the Internet. For example, in a case where a name of the event venue is known, the image is searched for on the Internet using the name as a search key and is used as image data of a similar environment. For example, in a case where the posted matter is the horizontal banner on the stage, "stage" or "stand" may be further used as the search key. A degree of "similarity" may be visually determined by the user by displaying the image data obtained by search on the display device 26. In a case where an event is actually held in the same event venue in the past, image data at the time can be used as the image data of the similar environment.

A specific processing algorithm is, but not limited to, (1) In a case where the picture of the event venue is present, use the picture as the image data 50, (2) In a case where the picture of the event venue is not present, use the picture of the event venue in the past as the image data, and (3) In a case where a picture of the event venue in the past is not present, search for the picture on the Internet.

In a case where image data similar to the event venue is searched for on the Internet and is not present, such a case is presented to the user, and the user manually inputs the actual dimension of the event venue, the actual dimension of the stage, and the like. In this case, since the image data 50 to be composited is not present, for example, a default template image similar to the actual dimension is used as the image data 50 and displayed on the display device 26 by compositing the image of the posted matter in the template image.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printed matter processing apparatus comprising:
   a communication interface that acquires image data of an environment in which a printed matter is set;
   a display; and
   a processor configured to, by executing a program,
      input the image data acquired by the communication interface,
      perform object recognition on the image data to identify a target with a known dimension,
      estimate an actual dimension of the environment based on the identified target with the known dimension in the image data,
      display how the printed matter is seen in a case where the printed matter is set in the environment on the display, by compositing the printed matter in the image data in accordance with a printing condition of the printed matter, wherein the printing condition is associated with the estimated actual dimension of the environment, and
      decide the printing condition of the printed matter by changing the printing condition of the printed matter in accordance with a user operation and displaying the printed matter.

2. The printed matter processing apparatus according to claim 1,
   wherein the printing condition includes at least one of a dimension, a color, a pattern, a font, or resolution of the printed matter.

3. The printed matter processing apparatus according to claim 1,
   wherein the processor is configured to
      estimate at least an appropriate dimension of the printed matter with respect to the image data of the environment from the input image data, and
      display the printed matter on the display by compositing the printed matter in the image data using the estimated appropriate dimension.

4. The printed matter processing apparatus according to claim 2,
   wherein the processor is configured to
      estimate at least an appropriate dimension of the printed matter with respect to the image data of the environment from the input image data, and
      display the printed matter on the display by compositing the printed matter in the image data using the estimated appropriate dimension.

5. The printed matter processing apparatus according to claim 3,
   wherein the processor is configured to estimate the appropriate dimension from the image data using a machine learning model.

6. The printed matter processing apparatus according to claim 4,
   wherein the processor is configured to estimate the appropriate dimension from the image data using a machine learning model.

7. The printed matter processing apparatus according to claim 1,
   wherein the communication interface acquires picture data of the environment as the image data.

8. The printed matter processing apparatus according to claim 1,
   wherein the communication interface acquires image data of an environment similar to the environment in a case where the image data of the environment is not present.

9. The printed matter processing apparatus according to claim 1,
   wherein the printed matter is any of a posted matter, a wallpaper, a poster, and a cover.

10. The printed matter processing apparatus according to claim 2,
    wherein the printed matter is any of a posted matter, a wallpaper, a poster, and a cover.

11. The printed matter processing apparatus according to claim 3,
    wherein the printed matter is any of a posted matter, a wallpaper, a poster, and a cover.

12. The printed matter processing apparatus according to claim 4,
    wherein the printed matter is any of a posted matter, a wallpaper, a poster, and a cover.

13. The printed matter processing apparatus according to claim 5,
    wherein the printed matter is any of a posted matter, a wallpaper, a poster, and a cover.

14. The printed matter processing apparatus according to claim 6,
   wherein the printed matter is any of a posted matter, a wallpaper, a poster, and a cover.

15. The printed matter processing apparatus according to claim 7,
   wherein the printed matter is any of a posted matter, a wallpaper, a poster, and a cover.

16. The printed matter processing apparatus according to claim 1,
   wherein the identified target with the known dimension is an object with a standardized dimension.

17. A non-transitory computer readable medium storing a program causing a computer to execute a process, the process comprising:
   inputting image data of an environment in which a printed matter is set;
   performing object recognition on the image data to identify a target with a known dimension;
   estimating an actual dimension of the environment based on the identified target with the known dimension in the image data;
   displaying how the printed matter is seen in a case where the printed matter is set in the environment on a display, by compositing the printed matter in the image data in accordance with a printing condition of the printed matter, wherein the printing condition is associated with the estimated actual dimension of the environment; and
   deciding the printing condition of the printed matter by changing the printing condition of the printed matter in accordance with a user operation and displaying the printed matter.

* * * * *